Patented July 15, 1947

2,424,066

UNITED STATES PATENT OFFICE 2,424,066

DISAZO DYES FROM DIHYDROXY BENZIDINE

Fritz Straub, Kaiseraugst, and Jakob Brassel and Peter Pieth, Basel, Switzerland, assignors to Society of Chemical Industry in Basle, Basel, Switzerland, a Swiss firm No Drawing. Application August 16, 1943, Serial No. 498,886. In Switzerland February 18, 1941

12 Claims. (Cl. 260—182)

This application is a continuation-in-part of our copending application Serial No. 431,172, filed February 16, 1942.

The present invention is concerned with valuable new disazo dyestuffs, and a process for preparing the same. The present invention is particularly concerned with direct dyeing cotton dyestuffs (also called substantive dyestuffs), and still more particularly with dyestuffs capable of being metallized, for instance, coppered, in substance, in the dyebath or on the fiber, as the case may be.

According to the present invention tetrazotized 3:3' - dihydroxy - 4:4' - diaminodiphenyl is coupled with two molecular proportions of coupling components as defined hereinafter.

3:3'-dihydroxy - 4:4' - diaminodiphenyl, which is a known compound and which may be obtained for instance by saponifying dianisidine by means of aluminum chloride, has not hitherto found any industrial use. Although a few dyestuffs prepared with tetrazotized 3:3'-dihydroxy-benzidine have been described in the literature, the said compound has generally been regarded to be of no practical value. This is probably due to several facts. First of all it was generally believed that the said product would be too expensive for the commercial manufacture of dyestuffs. Furthermore, the very few dyestuffs hitherto prepared with the said tetrazo compound did not show properties which might make them compete successfully with other dyestuffs, and it is to be remarked that, according to the prescriptions found in the literature, correct coupling is in most cases not brought about, which obviously does not lead to correct disazo dyestuffs.

According to the present invention it has been found that the cost of 3:3'-dihydroxy-4:4'-diaminodiphenyl is by no means prohibitive for the manufacture of dyestuffs therefrom, since such dyestuffs as hereinafter defined show very valuable properties which more than outweigh any difficulties encountered in preparing the said starting material. Further, it will be shown hereinafter that correct coupling to form correct disazo dyestuffs can be brought about, and that dyestuffs of much superior properties can be produced thereby.

For the sake of simplicity coupling may be carried out with two molecular proportions of the same coupling component. However, it is not unduly difficult to effect coupling with two different coupling components since tetrazotized 3:3'-dihydroxy-4:4'-diaminodiphenyl has a great tendency to couple first with one diazo group and afterwards with the other.

3:3'-dihydroxy-4:4'-diaminodiphenyl may be obtained by saponification of dianisidine by means of aluminum chloride and may be purified if necessary according to known methods. It may be tetrazotized in known manner and the tetrazo compound may be used immediately after tetrazotizing or may be separated, as described in the examples below.

According to the present invention a tetrazotized 3:3'-dihydroxy-4:4'-diaminodiphenyl is coupled with two molecular proportions of coupling components at least one of which is a 1-hydroxynaphthalene containing an auxochromic group in the 8-position. Such auxochromic groups are, for instance, an amino or a substituted amino group, or a further hydroxyl group, or any other group possessing auxochrome properties. These coupling components may carry further substituents in suitable positions of the naphthalene nucleus, for instance solubilizing groups, such as sulfonic acid or carboxyl groups or both, as well as non-solubilizing substituents, such as halogen. If only one coupling component of this kind is used as remaining coupling components any such component may be used, for instance those belonging to the benzene, naphthalene or open-chain series.

According to one feature of the present invention those coupling components are further used which contain at least one nitrogen atom having attached thereto at most one hydrogen atom.

The coupling components containing nitrogen mentioned above may belong to the isocyclic, heterocyclic or open chain series. As a first group of such components hydroxy naphthalenes containing at least one nuclearly bound sulfonic acid group are to be mentioned. They must contain at least one nitrogen atom which is bound in a form different from primary amino groups. Thus it may be in the form of secondary or acylated amino group, e. g., as an imide linkage between two radicals such as in 5:5'-dihydroxy-2:2'-dinaphthylamino-7:7'-disulfonic acid, 2-amino-5-hydroxynaphthalene-7-sulfonic acid, 2-phenylamino - 8 - hydroxynaphthalene - 6 - sulfonic acid, or in form of an acid amide group such as in 1-toluenesulfonylamino-8-hydroxynaphthalene-4-sulfonic acid or in the form of a nitro group. The said nitrogen atom may further be present as a member of a heterocyclic ring such as in pyrazolones. It is, as a rule, desirable to select the coupling components so as coupling will take place in the ortho position to a hydroxyl group.

Besides the above mentioned coupling components other suitable components, such as aminonaphtholsulfonic acids in which the amino group is acylated by any suitable carboxylic or sulfonic acid, may be used, wherein the acid may be aliphatic (formic, acetic, propionic acid, etc.) aromatic (benzoic, naphthoic acid, etc.) or heterocyclic (pyridine-carbamic acid, etc.) and contain further substituents.

As a further group of coupling components those containing nitrogen in a heterocyclic ring and especially pyrazolones come into consideration. They may contain substituents as usual, for instance an aryl (phenyl or naphthyl) group in the 1 and an alkyl (e. g. methyl) or carboxyl or modified carboxyl group in the 3-position; the aryl group may itself be substituted for instance by halogen, nitro or sulfo groups or by the sulfamido or salicylic acid grouping etc.

Especially valuable dyestuffs are obtained with pyrazolone coupling components free from sulfonic acid groups. It is surprising that the dyestuffs obtained with such components are soluble enough for dyeing purposes, even if they are completely devoid of solubilizing groups, i. e. if they contain not even a carboxylic acid group. It is further surprising that pyrazolones can be correctly coupled with tetrazotized 3:3'-dihydroxybenzidine in a medium alkaline even with sodium carbonate without difficulties in many instances.

According to another feature of the present invention there is used as further coupling component a hydroxynaphthalene free from sulfonic acid groups.

Such hydroxynaphthalenes are used according to this feature of the invention which contain neither a sulfonic acid group as nuclear substituent nor in external linkage. It is advantageous that these hydroxynaphthalenes should be completely free from any substituents which have a strong solubilizing action such as carboxylic acid groups. They may advantageously contain at least one further substituent, preferably only one further substituent of another kind, for example an auxo-chromic group, such as a hydroxyl group, an amino (including substituted amino) group, an alkoxy group or a sulphamido group, and these substituents may, for example, be distributed on the two benzene rings forming the naphthalene nucleus. It will be advantageous to use such hydroxynaphthalenes which permit a coupling in the ortho-position to the hydroxyl group.

Such components are, for example, the various dihydroxynaphthalenes, such as -1:5-, 2:6- and -2:7-dihydroxynaphthalene, 2-amino-7-hydroxynaphthalene, 1-amino-7-hydroxynaphthalene, 2:6-dihydroxynaphthalene-monoglycerine ether, as well as N-substituted amino-hydroxynaphthalenes, in which the amino group, for example, can be substituted by alkyl or hydroxyalkyl radicals. Furthermore such hydroxynaphthalenes also come into consideration which contain other substituents besides those mentioned above, e. g. a sulfonamide group.

Particularly valuable dyestuffs are obtained if hydroxynaphthalenes are used which are absolutely free from water solubilizing groups and, for example, are also free from carboxyl groups. These dyestuffs can be advantageously dyed from baths rendered alkaline with alkali hydroxide.

In all the instances mentioned above coupling is effected in an alkaline medium. It is to be remarked, however, that there are many coupling components, especially those of the naphthalene series, which do not combine in a satisfactory manner with tetrazotized 3:3'-dihydroxy-4:4'-diaminodiphenyl when coupling occurs in the usual manner, i. e. in a medium alkaline with sodium carbonate, even if pyridine or similar promoters are added. The combination is often incomplete to such an extent that only little or no diazo dyestuff is produced, and a monoazo dyestuff is obtained as main product. It is a further feature of the present invention that in all instances where combination is slow and/or incomplete with the usual coupling methods, coupling is effected in a medium alkaline with a hydroxide of the alkali or alkaline earth metal series including ammonia. It is often desirable to use strongly caustic alkaline media, for instance strong solutions of caustic potash or soda, but, in other instances, the hydroxides of calcium, barium, strontium or magnesium are suitable too, whereas media substantially free from carbonate generally appear to be desirable whenever combination is difficult.

If these reaction media are properly used combination may also be effected with 2-hydroxynaphthalene sulfonic acids, such as 2-hydroxynaphthalene-6-sulfonic acid, 2-hydroxynaphthalene-3:6-disulfonic acid, as well as with 2-amino-5-hydroxynaphthalene-7-sulfonic acid and 2-amino-5-hydroxynaphthalene-1:7-disulfonic acid, substantially avoiding the production of monoazo-dyestuffs.

The disazo dyestuffs of the present invention are suitable for dyeing and printing the most diverse materials, especially cellulose fibers, such as cotton and other vegetable fibers, rayon from regenerated cellulose including staple fibers, and also for dyeing and printing animal fibers such as wool, silk and leather. Due to the fact that the said dyestuffs are derived from an ortho-hydroxydiazo compound they are capable of forming complex metal compounds, for instance, with the metals copper, cobalt, nickel, iron, chromium, vanadium, manganese.

Many of the foregoing dyestuffs yield very valuable complex metal compounds if treated in substance with agents yielding metal. This is especially true of those dyestuffs which contain more than two sulfonic acid groups, for instance those derived from two coupling components belonging to the group of hydroxynaphthalene disulfonic acid coupling components. With other dyestuffs it may be more advantageous to effect metallization during or, still better, after dyeing according to the known aftertreating methods. With special advantage use may be made of the dyeing methods described in U. S. Patents 2,148,659 and 2,185,905, whereby metallizing is preferably carried out with agents yielding metal which are stable towards alkalies, for instance complex tartrates of copper or other metals.

In some cases it may also be useful to treat some dyestuffs as mentioned above in substance with such alkaline metallizing agents.

Furthermore it is possible to make use of complex metal compounds of the dyestuffs according to the present invention for coloring masses, varnishes, lacquers, resins, both artificial and natural, and spinning solutions.

Whether it is preferable to produce the aforementioned complex metal compounds on the fiber or in substance depends on various properties thereof, inter alia, whether the complex metal compounds are soluble, whether the metal-free dyestuffs possess sufficient affinity for the fiber to be dyed, etc.

The following examples illustrate the invention, the parts being by weight unless otherwise stated:

Example 1

21.6 parts of 3:3'-dihydroxy-4:4'-diamino-diphenyl, in the form of its dichlorhydrate, are stirred in 100 parts of water and 12 parts of concentrated hydrochloric acid and is tetrazotized by addition of an aqueous solution of 13.8 parts of sodium nitrite at 5–8° C. When tetrazotization is complete, the suspension is cooled to 3° C., neutralized by addition of 6.4 parts of soda and filtered to obtain the precipitated tetrazo compound.

64.5 parts of 1-phenylamino-8-hydroxynaphthalene-4-sulfonic acid are dissolved in 160 parts by volume of caustic potash of 40 per cent. strength by volume and are cooled to 5° C. The filtered tetrazo solution is added, and the whole is stirred for 2 hours at 5–8° C. and then, until coupling is complete, at 10–20° C. The new disazo dyestuff is for the most part precipitated. It is filtered off and purified by dissolving in dilute soda solution and salting out.

The new dyestuff of the formula

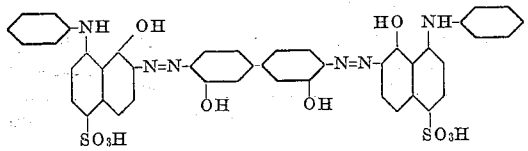

is a black powder when dry which dissolves in water with a blue color, in 10 per cent. soda solution to a greenish-blue, in 10 per cent. caustic soda to a reddish blue and in concentrated sulfuric acid to a bluish green solution. When dyed and coppered—by a one or a two bath method—on cotton, it yields green-blue shades of good fastness.

Example 2

21.6 parts of 3:3'-dihydroxy-4:4'-diaminodiphenyl are tetrazotized, neutralized and filtered as described in Example 1.

81 parts of 1-toluene-sulfonylamino-8-hydroxynaphthalene-4-sulfonic acid are stirred in 240 parts of water and 29.6 parts of slaked lime are added. The reaction mixture is cooled to 5° C. and the filtered tetrazo solution is added. Coupling is carried out for 2 hours at 5–8° C., then for 24 hours at 10–15° C., and, to conclude the reaction, for 24 hours at 20–25° C. The reaction mass is then diluted with 800 parts of water. A solution of 60 parts of soda in 300 parts of water is added, and the solution is filtered from the calcium carbonate precipitated. The new dyestuff is partly salted out by addition of 150 parts of common salt, and salting out is completed by dropping in 140 parts of 10 per cent. hydrochloric acid.

The new dyestuff possesses the formula

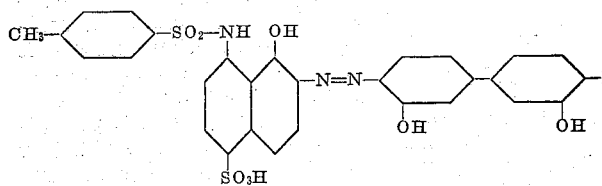

and, when dry, is a bronzy black powder, dissolving in water to a blue, in 10 per cent. caustic soda to a reddish blue, in 10 per cent. soda solution to a blue and in concentrated sulfuric acid to a green solution. When dyed on cotton and aftertreated with copper salts, either by a one- or by a two-bath process, green shades of good fastness are obtained.

Example 3

21.6 parts of 3:3'-dihydroxy-4:4'-diaminodiphenyl are tetrazotized as described in Example 1, the solution is neutralized with soda solution and the precipitated tetrazo compound is filtered off.

65 parts of 1-amino-8-hydroxynaphthalene-2:4-disulphonic acid are dissolved in 130 parts of water and 25 parts of caustic potash. The solution is cooled to 5° C., and the filtered tetrazo compound is added. The coupling temperature is maintained for 2 hours at 5–8° C., then for 24 hours at 10–15° C. to conclude the coupling, the temperature is then raised to 20–25° C. The new disazo dyestuff is largely precipitated. It is filtered off and purified by dissolving in dilute soda solution and salting out.

It possesses the formula

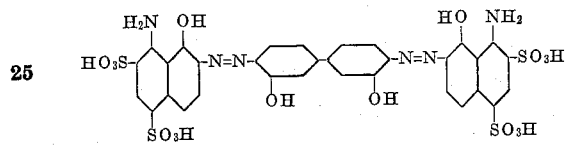

and is a dark colored powder which dissolves in water and soda solution to a blue, in dilute caustic alkalies to a blue-violet and in concentrated sulfuric acid to a greenish-blue solution. Blue tones of good fastness properties are obtained when the dyestuff is applied to cotton and after-coppered, either by a one or a two bath process.

Example 4

21.6 parts of 3:3'-dihydroxy-4:4'-diaminodiphenyl are tetrazotized as described in Example 1, the solution is neutralized with soda solution and the precipitated tetrazo compound is filtered off.

49.3 parts of 1-amino-8-hydroxynaphthalene-4-sulfonic acid are dissolved in 105 parts of water and 22 parts of caustic potash, and the solution is cooled to 5° C. The filtered tetrazo compound is added and coupling is carried out for 24 hours at 10–15° C., then for 36 hours at 20–25° C. The coupling mass is then diluted with 700 parts of water, 42 parts of common salt are added and the dyestuff is precipitated by addition of 130 parts by volume of 2 per cent. hydrochloric acid. The new disazo dyestuff is purified by dissolving in dilute soda solution and salting out.

When dry, it is a black-brown powder which dissolves in water and 10 per cent. soda solution with a blue, in 10 per cent. caustic soda with a reddish blue and in concentrated sulfuric acid with a bluish green color. When dyed on cotton and aftertreated with copper salts, in either a one or a two bath process, it yields blue shades of good fastness properties.

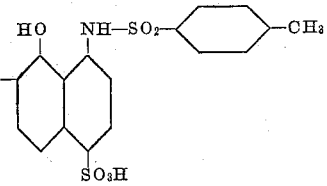

A similar dyestuff is obtained if coupling is effected successively with 1-amino-8-hydroxynaphthalene-2:4-disulfonic acid and 1-amino-8-hydroxynaphthalene-4-sulfonic acid.

Example 5

21.6 parts of 3:3'-dihydroxy-4:4'-diaminodiphenyl are tetrazotized as described in Example 1, the solution is neutralized with soda solution and the precipitated tetrazo compound is filtered off.

66 parts of 1-amino-8-hydroxynaphthalene-3:6-disulfonic acid are stirred in 200 parts of water and a fresh magnesium hydroxide paste prepared from magnesium chloride and caustic soda, corresponding to 21.2 parts of Mg(OH)$_2$, is added. The suspension as cooled to 5° C., the filtered tetrazo compound is added and coupling is carried out for 48 hours at 10–20° C. When the reaction is over, a solution of 30 parts of soda in 150 parts of water is added and the magnesium carbonate precipitated is filtered off. The new dyestuff is obtained by adding 130 parts of 10 per cent. hydrochloric acid to the filtrate and salting out.

When dry, it is a grey black powder of the formula

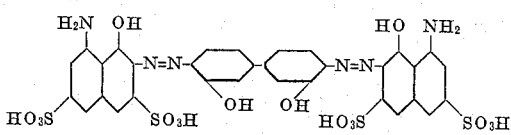

which dissolves in water and 10 per cent. soda solution with a blue, in 10 per cent. caustic soda with a reddish blue and in concentrated sulfuric acid with a green color. When dyed on cotton and aftertreated with copper salts by either a one or a two bath process, fast blue shades are obtained.

Example 6

21.6 parts of 3:3'-dihydroxy-4:4'-diaminodiphenyl are tetrazotized as described in Example 1, the solution is neutralized with soda solution and the precipitated tetrazo compound is filtered off.

66 parts of 1-amino-8-hydroxynaphthalene-3:6-disulfonic acid, in the form of its monosodium salt, are stirred in 200 parts of water and 61.2 parts of barium oxide are added. The suspension is cooled to 5° C., and the filtered tetrazo compound is added. The coupling temperature is maintained for 2 hours at 5–8° C. and then, until the reaction is complete, at 10–20° C., when a warm (50° C.) solution of 60 parts of soda in 300 parts of water is added. The barium carbonate is removed by filtering and the dyestuff is obtained by salting out with 100 parts of common salt and dropping in 135 parts of 10 per cent. hydrochloric acid.

The new dyestuff is a grey black powder which dissolves in water, 10 per cent. soda solution and 10 per cent. caustic soda with a blue and in concentrated sulfuric acid with a green color. When dyed on cotton and aftertreated with copper salts, in either a one or a two bath process, it yields blue shades of very good fastness properties.

Example 7

10.8 parts of 3:3'-dihydroxybenzidine are tetrazotized in the usual manner with 6.9 parts of sodium nitrite in the presence of hydrochloric acid. The crystallized tetrazoxide is filtered off and at 5° C. is added to a mixture of 12 parts of 1:8-dihydroxynaphthalene-4-sulfonic acid and 20 parts calcium hydroxide in 150 parts of water. Stirring is carried out for 1 hour at 5 to 8° C. and for 1 hour at 10 to 15° C. Hereupon a mixture of 15.8 parts of 2-phenylamino-5-hydroxynaphthalene-7-sulfonic acid, 9 parts calcium hydroxide and 100 parts of water is added and stirred for 1 hour at 15 to 20° C. and coupling is carried to an end at 25 to 30° C. The coupling mixture is diluted with 1000 parts of hot water and after the addition of 65 parts of anhydrous sodium carbonate, the temperature is maintained at 80 to 85° C. for half an hour. The liquid is filtered off from the precipitated calcium carbonate and sodium chloride and hydrochloric acid are added to the filtrate. The disazo dyestuff is filtered off and dried. When dry it forms a dark green bronzy powder which dissolves in water and dilute caustic alkalies to reddish blue, in dilute soda solution to a cornflower blue and in concentrated sulfuric acid to a greenish blue solution. It yields pure blue shades of very good fastness to washing and light on being dyed and coppered on vegetable fibers by either a one or two bath process.

If in the present example 1:8-dihydroxynaphthalene-4-sulfonic acid is replaced by an equivalent quantity of 2-(4'-hydroxy-3'-carboxyphenyl)-amino-5-hydronaphthalene-7-sulfonic acid, then a dyestuff is obtained which produces almost the same shades of similar fastness properties.

Example 8

21.6 parts of 3:3'-dihydroxy-4:4'-diaminodiphenyl are tetrazotized as described in Example 1, the solution is neutralized with soda solution and the precipitated tetrazo compound is filtered off.

66 parts of 1-amino-8-hydroxynaphthalene-3:6-disulfonic acid are stirred in 200 parts of water and 29.6 parts of calcium hydroxide are added. The suspension is cooled to 5° C., and the filtered tetrazo compound is added. The coupling temperature is maintained for 2 hours at 5–8° C. and then for 24 hours at 10–20° C., when a solution of 60 parts of soda in 300 parts of water at 50° C. is added to the reaction mass, and the calcium carbonate is removed by filtering. The filtrate is stirred with 100 parts of common salt, and the new dyestuff is obtained by dropping in 135 parts of 10 percent. hydrochloric acid.

When dry, the new dyestuff is a grey black powder which dissolves in water, 10 percent. soda solution and 10 percent. caustic soda with a blue and in concentrated sulfuric acid with a green color. When dyed on cotton, it yields when treated with copper salts either before or after dyeing in a one or two bath process, fast blue shades.

Example 9

21.6 parts of 3:3'-dihydroxy-4:4'-diaminodiphenyl, in the form of its dichlorhydrate, are tetrazotized in 100 parts of water, neutralized and filtered as described in Example 1.

66 parts of 1-amino-8-hydroxynaphthalene-4:6-disulfonic acid are dissolved in 100 parts of water and 50 parts of caustic potash, of 50 percent by volume of potassium hydroxide. The solution is cooled to 5° C., the above tetrazo compound is added, and the reaction mixture is stirred for 4 hours at 5–8° C., then 24 hours at 10–15° C. and, finally, at 20–30° C. until the coupling is complete. The new dyestuff is precipitated by addition of alcohol and is purified by dissolving in dilute soda solution and salting out.

When dry, the new dyestuff is a black powder which dissolves in water and 10 percent caustic soda to a blue violet, in 10 percent soda solution to a reddish blue and in concentrated sulfuric acid to a blue solution.

The new dyestuff yields fast blue tones when dyed on cotton and aftertreated with copper salts in a one or two bath process. Similar blue tones are obtained by treating the dyestuff with copper salts and then dyeing it on to cotton.

A similar dyestuff is obtained if the said tetrazo compound is coupled with 1 mol. of 1-amino-8-hydroxynaphthalene-4:6-disulfonic acid and 1 mol. of 1-amino-8-hydroxynaphthalene-3:6-disulfonic acid.

Example 10

10.8 parts of 3:3'-dihydroxybenzidine are tetrazotised in the usual manner in hydrochloric acid solution with sodium nitrite. The crystalline precipitated tetrazoxide is added to a mixture of 24 parts of 1:8-dihydroxynaphthalene-4-sulfonic acid, 23 parts of calcium hydroxide and 200 parts of water cooled to 5° C. Stirring is carried out for 2 hours at 5 to 8° C. for 24 hours at 15 to 20° C. and coupling terminated at 25 to 30° C. The coupling mixture is diluted with 1000 parts of hot water and 50 parts of anhydrous sodium carbonate are added. After stirring for half an hour at 50° C. the liquid is filtered off from the precipitated calcium carbonate. By the addition of sodium chloride and hydrochloric acid to the filtrate, the disazo dyestuff formed is precipitated. It is a dark bronzy powder which dissolves in water to a violet blue, in dilute alkalies to a violet, and in concentrated sulfuric acid to a greenish blue solution. It yields blue shades which are fast to washing and to light on being dyed and coppered on vegetable fibers by either a one or two bath process.

Example 11

21.6 parts of 3:3'-dihydroxy-4:4'-diaminodiphenyl dissolved in a mixture of 10 parts by volume of hydrochloric acid of 30% strength and 200 parts of water are tetrazotized with an aqueous solution of 13.8 parts of sodium nitrite; the reaction mixture is then neutralized and the tetrazo compound filtered off.

75 parts of 1-acetylamino-8-hydroxynaphthalene-3:6-disulfonic acid are stirred into a suspension of 30 parts of calcium hydroxide in 300 parts of water and cooled to 3° C. The filtered tetrazo compound is added and coupling carried out for 3 hours at 3 to 5° C., for 2 hours at 5 to 10° C., for 16 hours at 10 to 15° C. and till the termination of the reaction at 20 to 25° C. Hereupon it is diluted with 400 parts of water and a solution of 45 parts of soda in 250 parts of water is added and the liquid filtered off from the calcium carbonate. The new dyestuff is precipitated by the addition of sodium chloride.

When dry it forms a black powder which yields blue shades with good fastness properties on being dyed and coppered on cotton by either a one or two bath process.

Example 12

105 parts of the disazo dyestuff obtained according to Example 11 from tetrazotized 3:3'-dihydroxy-4:4'-diaminodiphenyl and 2 molecular proportions of 1-acetylamino-8-hydroxynaphthalene-3:6-disulfonic acid are dissolved in 3000 parts of water at 80° C. and stirred for 15 minutes with a solution of 55 parts of copper sulphate made alkaline with soda and 110 parts of sodium tartrate. The new copper compound is obtained by salting out.

When dry it forms a greyish black powder which dyes cotton pure blue shades with good fastness properties.

Example 13

96.4 parts of the disazo dyestuff obtained according to Example 8 from tetrazotized 3:3'-dihydroxy-4:4'-diaminodiphenyl and 1-amino-8-hydroxynaphthalene-3:6-disulfonic acid are dissolved in 3500 parts of water at 70° C. 40 parts of acetic anhydride are added and the whole stirred for 10 minutes. The acetyl compound of the disazo dyestuff is precipitated by the addition of sodium chloride. The acetyl compound of the disazo dyestuff is dissolved in 2000 parts of water at 80° C. and a solution of 55 parts of crystallized copper sulphate made alkaline with soda and 110 parts of sodium tartrate in 500 parts of water are added and stirred for 15 minutes at 80 to 90° C.

The new copper compound is precipitated by adding sodium chloride.

When dry it forms a greyish black powder which yields on cotton pure blue shades with good fastness properties.

Example 14

96.4 parts of the disazo dyestuff obtained according to Example 8 from tetrazotized 3:3'-dihydroxy-4:4'-diaminodiphenyl and 2 molecular proportions of 1-amino-8-hydroxynaphthalene-3:6-disulfonic acid are dissolved in 3000 parts of water and stirred for 15 minutes at 80 to 90° C. with a solution consisting of 55 parts of crystallized copper sulphate and 110 parts of sodium tartrate made alkaline with soda.

The solution is allowed to cool to 70° C. and then 40 parts of acetic anhydride are added and stirred for 10 minutes. The acetylated copper compound is obtained by salting out.

The new dyestuff when dry is a greyish dark powder which yields on cotton pure blue shades with good fastness properties.

What we claim is:

1. A disazo dyestuff of the general formula

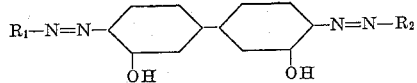

wherein $R_1$ and $R_2$ stand for radicals of hydroxynaphthalene coupling components at least one of which is a 1-hydroxynaphthalene containing an auxochromic group in 8-position and further at least one sulfonic acid group.

2. A disazo dyestuff of the general formula

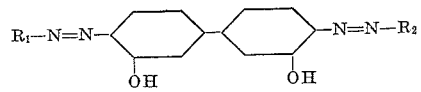

wherein $R_1$ and $R_2$ stand for radicals of hydroxynaphthalene coupling components at least one of which is a 1-hydroxynaphthalene containing a hydroxyl group in 8-position and further at least one sulfonic acid group.

3. A disazo dyestuff of the general formula

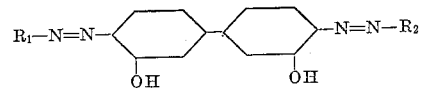

wherein $R_1$ and $R_2$ stand for radicals of hydroxynaphthalene coupling components at least one of which is a 1-hydroxy-naphthalene containing a hydroxyl group in 8-position and further one sulfonic acid group.

4. A disazo dyestuff of the general formula

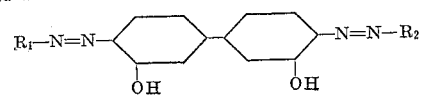

wherein $R_1$ and $R_2$ stand for radicals of hydroxynaphthalene coupling components at least one of which is a 1-hydroxynaphthalene containing an auxochromic group in 8-position and further one sulfonic acid group.

5. A disazo dyestuff of the general formula

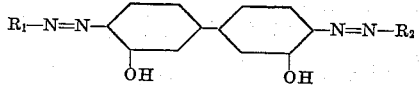

wherein $R_1$ and $R_2$ stand for radicals of 1-hydroxynaphthalenes containing an auxochromic group in 8-position and further at least one sulfonic acid group.

6. A disazo dyestuff of the general formula

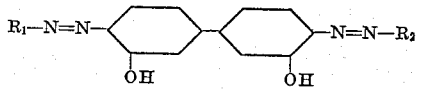

wherein $R_1$ and $R_2$ stand for radicals of 1-hydroxynaphthalenes containing an auxochromic group in 8-position and further one sulfonic acid group.

7. A disazo dyestuff of the general formula

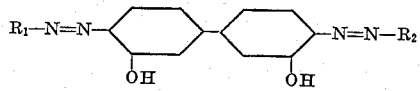

wherein $R_1$ and $R_2$ stand for radicals of 1-hydroxynaphthalenes containing a hydroxyl group in 8-position.

8. A disazo dyestuff of the general formula

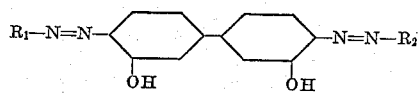

wherein $R_1$ and $R_2$ stand for radicals of 1-hydroxynaphthalenes containing an amino group in 8-position and further at least one sulfonic acid group.

9. A disazo dyestuff of the general formula

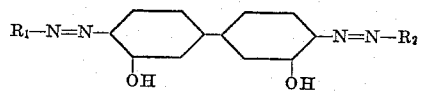

wherein $R_1$ and $R_2$ stand for radicals of 1-hydroxynaphthalenes containing a hydroxyl group in 8-position and further at least one sulfonic acid group.

10. The disazo dyestuff of the formula

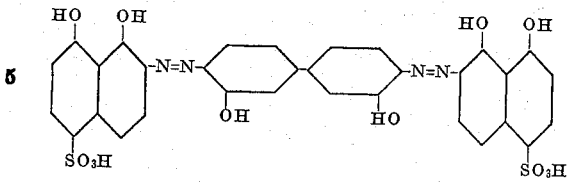

11. The disazo dyestuff of the formula

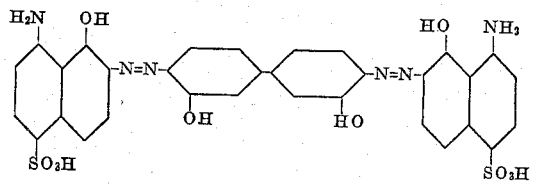

12. The disazo dyestuff of the formula

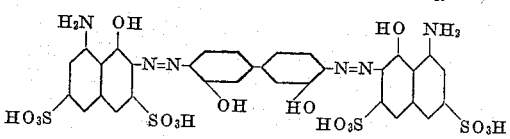

FRITZ STRAUB.
JAKOB BRASSEL.
PETER PIETH.

REFERENCES CITED

The following references are of record in the file of this patent:

UNITED STATES PATENTS

| Number | Name | Date |
| --- | --- | --- |
| 2,036,159 | Mendoza | Mar. 31, 1936 |
| 1,921,337 | Wiedemann et al. | Aug. 8, 1933 |
| 1,210,751 | Anderwert et al. | Jan. 2, 1917 |
| 1,889,732 | Stusser et al. | Nov. 29, 1932 |
| 2,241,796 | Taube et al. | May 13, 1941 |
| 2,193,438 | Taube et al. | Mar. 12, 1940 |

FOREIGN PATENTS

| Number | Country | Date |
| --- | --- | --- |
| 352,956 | Great Britain | July 14, 1931 |
| 6,874 | Great Britain | Jan. 31, 1891 |
| 102,881 | Great Britain | Jan. 4, 1917 |
| 78,937 | Germany | Dec. 21, 1894 |
| 163,896 | Switzerland | Nov. 16, 1933 |